(12) United States Patent
Wang

(10) Patent No.: US 6,419,002 B1
(45) Date of Patent: Jul. 16, 2002

(54) DUST-PROOF COVER WITH CONNECTING RODS

(76) Inventor: Greg Wang, No. 52, Kung Yeh 39 Rd., Hsi Tun Zone, Taichung (TW)

( * ) Notice: Subject to any disclaimer, the term of this patent is extended or adjusted under 35 U.S.C. 154(b) by 0 days.

(21) Appl. No.: 09/776,760

(22) Filed: Feb. 6, 2001

(51) Int. Cl.⁷ .............................................. E05D 15/06
(52) U.S. Cl. ..................................... 160/222; 160/202
(58) Field of Search ................................ 160/222, 202, 160/211, 216, 223; 384/15, 16; 409/134

(56) References Cited

U.S. PATENT DOCUMENTS

| | | | | |
|---|---|---|---|---|
| 4,039,021 A | * | 8/1977 | Moritz et al. ................ | 160/202 |
| 5,169,223 A | * | 12/1992 | Suzuki et al. ........... | 160/202 X |
| 5,560,415 A | * | 10/1996 | Geissler ....................... | 160/220 |
| 5,807,043 A | * | 9/1998 | Blank ...................... | 160/202 X |
| 5,915,897 A | * | 6/1999 | Reynolds ................ | 160/202 X |

\* cited by examiner

Primary Examiner—David M. Purol
(74) Attorney, Agent, or Firm—Browdy and Neimark, P.L.L.C.

(57) ABSTRACT

This invention is a dust-proof protection cover with connecting rods. It includes several protecting cover boards in the same shape with different sizes so that they are slidably engaged to each other. The sizes of protecting cover boards are decreasing and their connection will form a structure that can expand and contract along the same axis. On the bottom board of each protecting cover board, there is a sliding trough. In addition, there is a linking device is made of many connection shafts. All these connection shafts will form a device with serial protection cover that can expand and contract.

3 Claims, 5 Drawing Sheets

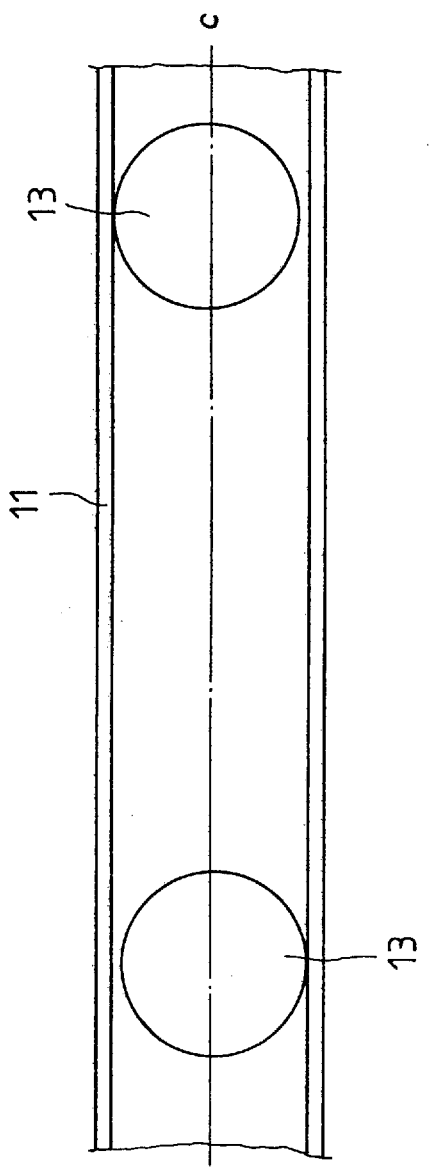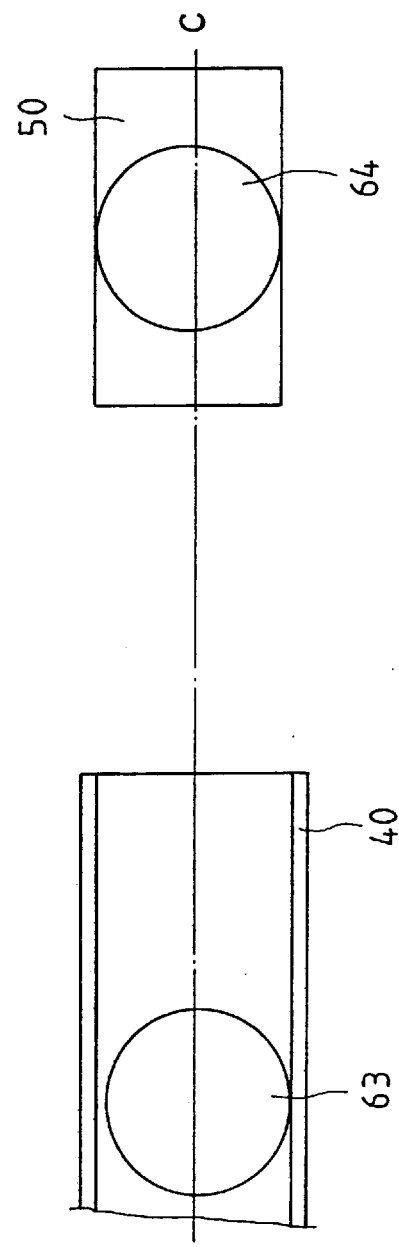

DUST-PROOF COVER WITH CONNECTING RODS

DETAILED DESCRIPTION

This invention is related to protection covers of tools or machines, especially a dust-proof protection cover with connecting rods.

PRIOR ART

This dust-proof protection cover is an innovative improvement of the previously designed protection cover created by the same inventor. The previous model is disclosed in Taiwan patent 152342. In that patent, the main content of design was the sliding trough (11) at the bottom board of the protection cover (10). There is also a parallel connecting shaft device (12). Such a device is made of many units of connecting shafts in the shape of X. Each unit of connecting shaft has two shafts with equal length. Two shafts are pivoted to each other at their center points in a way that the two ends of each shaft will form a pair of folded arms that will open and close. Each end of each unit of connecting shaft will connect to another pair of folded arms of another connecting shaft unit. Such a connection will form two pivot points (13). These two pivot points are inserted in a sliding trough (11) and can slide along the long axis of this sliding trough to reach the intended function of this design. (For the detailed structure and operation, please refer to the patent instruction manual. Details will not be repeated here.)

The function of this previous design was an improvement over traditional models. However, in spite of the high stability, the design still had the room for improvement. The previous design had a wider distance between the pivot point and the sliding trough to allow each pivot point (13) to move or slide smoothly within the sliding trough (11). In other words, the requirement for liberal allowance (a mechanical term) was bigger. Such a wider distance would cause each pivot point to shift or deviate within the sliding trough. Moreover, since the two pivot points in the sliding trough would shift or deviate (such as shifting to one side of the central line C or moving to both side of the central line C), sometimes two deviation values would occur during the shift. Because a dust-proof protection cover should have high precision, such deviation affects the overall operation of the protection cover. In order to reduce the degree of deviation and make the expansion and contraction of the protection cover smoother with less inaccuracy, the inventor has proposed this invention.

OBJECT AND SUMMARY OF THE INVENTION

The purpose of this invention is to provide a dust-proof protection cover with connecting rods to reduce the degree of deviation.

In order to reach the goal described above, the dust-proof protection cover with connecting rods according to the invention has the following parts. It includes several protecting cover boards in the same shape with different sizes. The sizes of protecting cover boards are decreasing and their connection will form a structure that can expand and contract along the same axis. On each axis perpendicular to the bottom board of the protection cover, there is at least one sliding trough. In addition, there is at least a linking device made of many shafts. Each connecting shaft has two shafts with equal length. Two shafts are pivoted to each other at their center points in a way that the two ends of each shaft will form a pair of folded arms that will open and close. Each end of each unit of connecting shaft will connect to another pair of folded arms of another connecting shaft unit. Such a connection will form two pivot points. One of these two pivot points is located on the bottom cover of the protecting cover board and the other pivot point is inserted into the sliding trough of the same protecting cover board. All these connections will form a device of serial protection cover that can expand and contract.

BRIEF DESCRIPTION OF THE DRAWINGS

Please refer to the figures to know the purposes, functions and special features of this invention.

FIG. 2 shows two pivot points of one unit of connecting shafts of the prior art cover of FIG. 1 slidably engaged in a sliding trough.

FIG. 6 shows one of the two pivot points of one unit of connecting shafts of the cover according to FIG. 3 slidably engaged in a sliding trough and the other pivot point fixed on a pivot base on a board of the cover.

DETAILED DESCRIPTION OF THE PREFERRED EMBODIMENT(S) OF THE INVENTION

Figure 1:
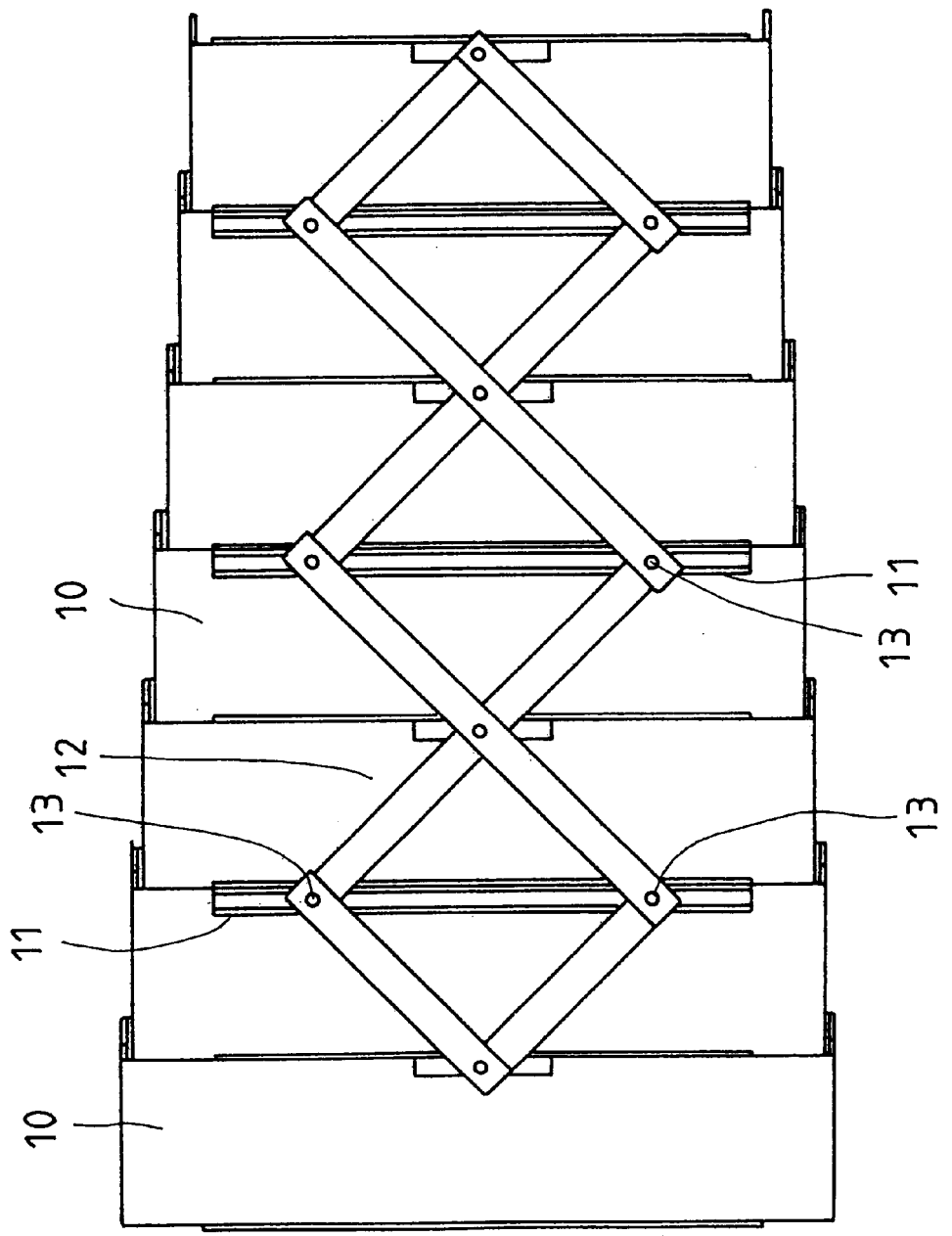
FIG. 1 is the bottom view of the prior art cover of patent number 152342.
Figure 3:
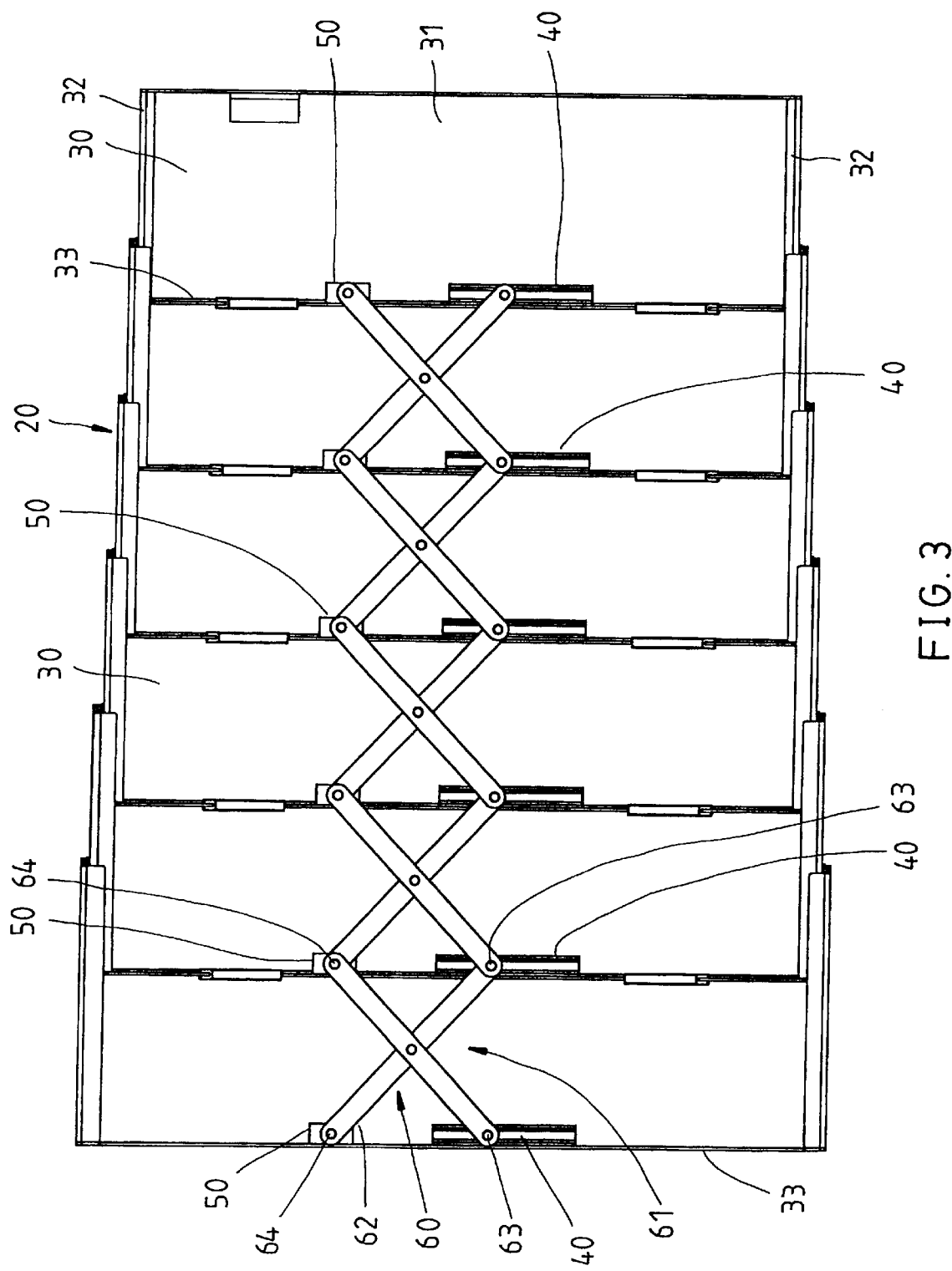
FIG. 3 is the bottom view of the cover according to the invention.

Please refer to FIG. 3 to see this invention, a dust-proof protection cover (20) with connecting rods. The cover (20) has:

Six protecting cover boards (30) with the same shape but different sizes which are slidably engaged together.

Each protecting cover board (30) has a cover top (31), two side-walls (32) and a backboard (33). The sizes of boards (30) decrease gradually so that each board (30) is slidably engaged at its side-walls (32) to an adjacent board (30) in order to form a structure that can expand and contract along its axis. Such structure is similar to that shown in Taiwan patent 152342.

Each protecting cover board (30) has:

A sliding trough (40) having a U-shaped cross-section with walls that are perpendicular to the dust-proof protection cover (20) in its axis of expansion and contraction. This trough is located on the bottom edge of the backboard (33) of the protecting cover board.

A pivot base (50) in the shape of a protruding piece is also located on the bottom edge of the backboard (33) of the protecting cover board at a distance from the sliding trough (40).

The dust-proof protection cover (20) has:

A connecting device (60) made of five units of connecting shafts (61). Each unit of connecting shafts consists of two shafts with equal length. The two shafts of each unit are pivoted to each other at their center points in an X shape so that the two ends of each shaft will form a pair of folded arms (62) that will open and close. Each end of each X-shaped unit of connecting shafts connects to an adjacent pair of folded arms of another connecting shaft unit. There are two inserted bolts (63) and (64) and such a connection forms a structure that can expand and contract. The inserted bolt (63) on the same side of the connecting device is inserted into the sliding trough (40) of the protecting cover board (30) so that the inserted bolt can slide along the long axis of the sliding trough. The other inserted bolt (64) is engaged to the pivot base (50) of each protecting cover board (30). Such a continuously connected links form a connecting structure of protection cover (20) with the functions of expansion and contraction.

With the above structure, when this invention of dust-proof protection cover (20) expands, each connecting shaft unit (61) will close its arms to make the inserted bolt (63) inside the sliding trough (40) at one side to slide along the trough and move closer to the other inserted bolt (64) engaged on pivot base (50).

Figure 4:
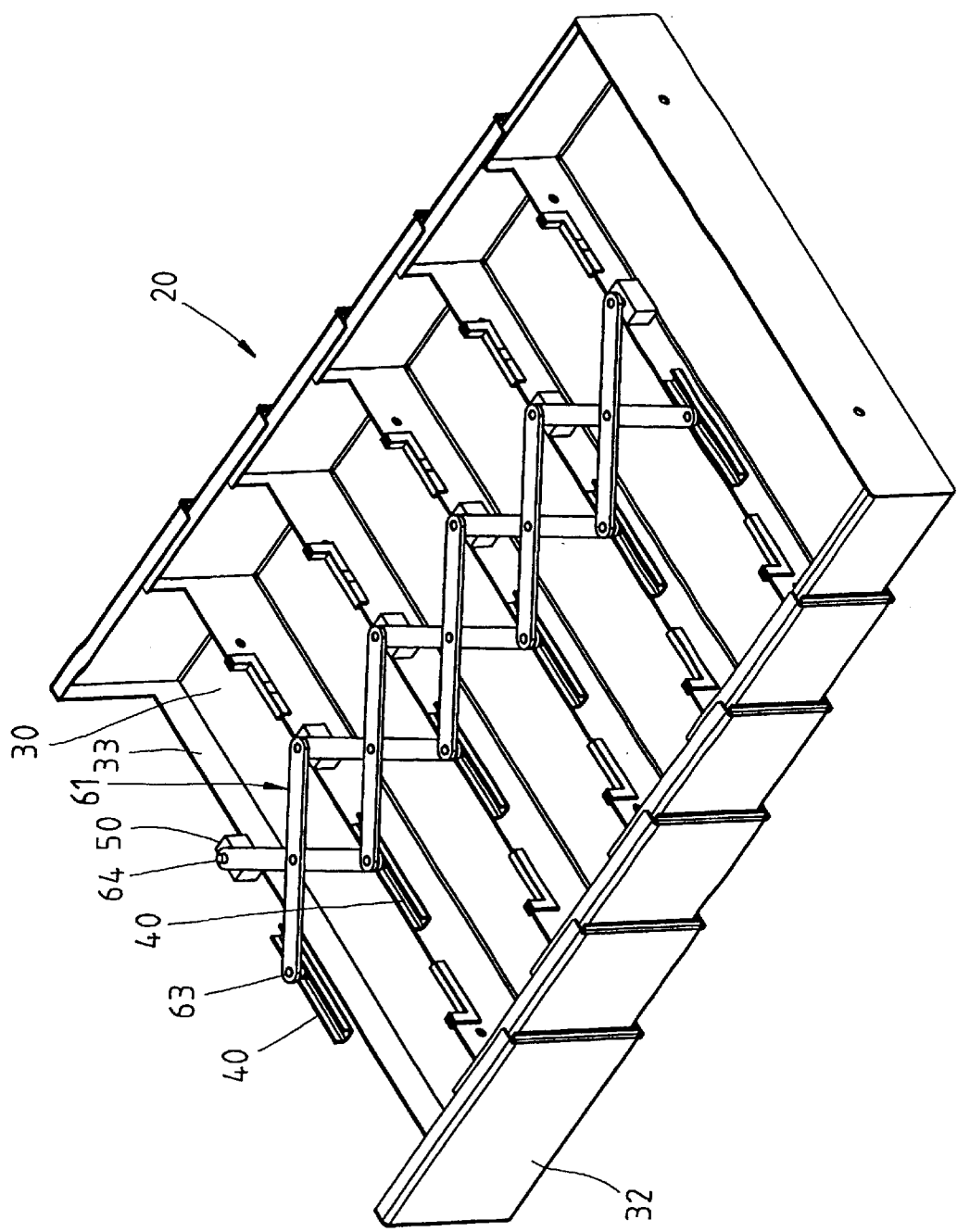
FIG. 4 is the structural bottom view of the cover of FIG. 3 when it is expanded.

This movement will push each protecting cover board (30) to expand along the longitudinal axis and reach its maximum expansion, as shown in FIG. 3. When the dust-proof protection cover (20) is contracted, each connecting shaft unit (61) will open its arms through the connecting device to make the inserted bolt in the sliding trough to move along the trough and move away from the inserted bolt (64). Then, the user can pull back each protecting cover board (30) with the connecting device to reach the purpose of contraction, as shown in FIG. 4.

Figure 5:
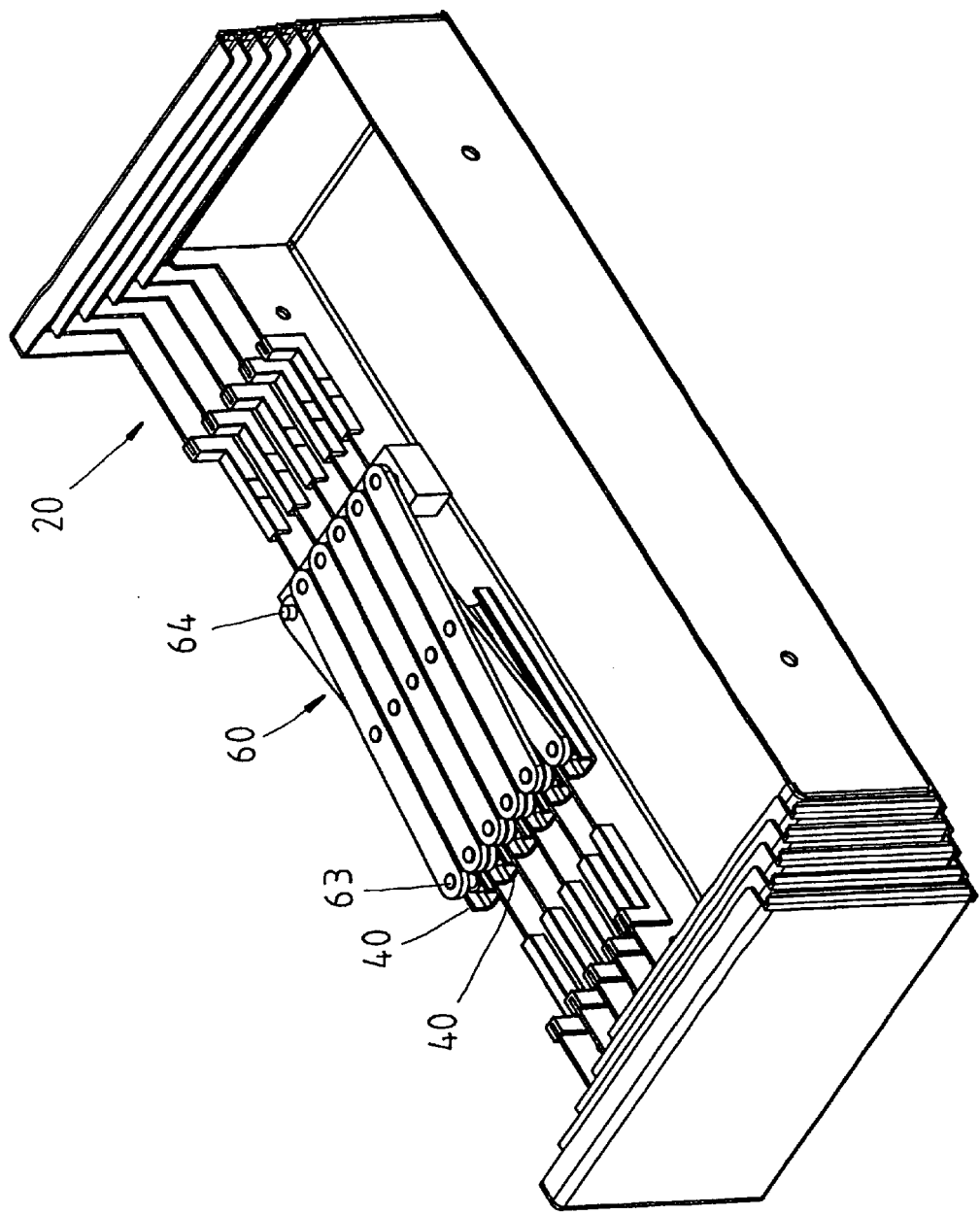
FIG. 5 is the structural bottom view of the cover of FIG. 3 when it is contracted.

The connecting shaft unit in the connecting device is linked by an inserted bolt (64) at one end to the protecting cover board. Although the liberal allowance between the sliding trough (40) and the inserted bolt (63) in this invention is as wide as that of the cover shown in Taiwan patent 152342, the way inserted bolts (63), (64) are set up can address disadvantages. Because only one inserted bolt (63) is inserted in the sliding trough and the other inserted bolt (64) is fixed on pivot base (50) such an arrangement will not result in any deviation. Therefore, as it is shown in FIG. 5, only one deviation value will occur when the inserted bolt (63) is connected to the sliding trough. Under such circumstance, this invention greatly improves the deviation issue when the dust-proof cover is in operation. In addition, the invention can successfully reach the goal of dust-proof.

What is claimed is:

1. A dust-proof protection cover comprising:

a plurality of cover boards slidably engaged together along a longitudinal axis of the cover;

a sliding trough on a longitudinal edge perpendicular to the longitudinal axis of the cover on each of the cover boards, wherein a longitudinal length of the trough is parallel to the longitudinal edge;

a plurality of linking devices equal in number to that of the cover boards;

each of the plurality of linking devices comprising two shafts of equal length pivoted to each other at a center point thereof so as to permit rotation relative to each other;

each of two-pairs of ends of the two shafts being engaged at the longitudinal edge of adjacent cover boards where the trough is located;

a first bolt through one end of each of the two pairs of ends being slidably and rotatably engaged in the sliding trough and another end of each of the two pairs of ends being rotatably engaged on a second bolt on the longitudinal edge where the trough is located;

wherein adjacent pairs of ends are also rotatably engaged to each other by said first and second bolts.

2. The dust-proof protection cover according to claim 1, wherein the second bolt is engaged on a pivot base fixed on the longitudinal edge wherein the trough is located.

3. The dust-proof protection cover according to claim 1, wherein each of the cover boards has a top cover, two side walls and a backboard, wherein the sliding trough and the pivot base are located at a bottom edge of the backboard.

* * * * *